(12) United States Patent
Kudoh

(10) Patent No.: US 7,714,290 B2
(45) Date of Patent: May 11, 2010

(54) FLAME DETECTOR

(75) Inventor: Akihisa Kudoh, Tokyo (JP)

(73) Assignee: Nittan Company Limited, Tokyo (JP)

( * ) Notice: Subject to any disclaimer, the term of this patent is extended or adjusted under 35 U.S.C. 154(b) by 0 days.

(21) Appl. No.: 12/125,814

(22) Filed: May 22, 2008

(65) Prior Publication Data
US 2008/0296502 A1   Dec. 4, 2008

(30) Foreign Application Priority Data
May 24, 2007  (JP) ............................. 2007-137532

(51) Int. Cl.
*G01J 5/02*   (2006.01)
(52) U.S. Cl. ............................ 250/339.15; 250/339.01; 250/339.05; 250/339.14
(58) Field of Classification Search ............ 250/339.01, 250/339.05, 339.14, 339.15
See application file for complete search history.

(56) References Cited

U.S. PATENT DOCUMENTS

| | | | |
|---|---|---|---|
| 4,160,163 A | | 7/1979 | Nakauchi |
| 4,455,487 A | * | 6/1984 | Wendt .................... 250/339.05 |
| 4,691,196 A | * | 9/1987 | Kern et al. .................. 340/578 |
| 4,742,236 A | | 5/1988 | Kawakami |
| 6,150,659 A | | 11/2000 | Baliga |
| 6,239,433 B1 | * | 5/2001 | Porter ...................... 250/338.3 |
| 6,255,651 B1 | * | 7/2001 | Laluvein et al. ........ 250/339.15 |
| 2003/0102434 A1 | | 6/2003 | Nakauchi |

FOREIGN PATENT DOCUMENTS

| | | |
|---|---|---|
| EP | 0 853 237 | 7/1998 |
| GB | 1 578 549 | 11/1980 |
| JP | 61-038428 | 2/1986 |
| JP | 2006-98372 | 4/2006 |

OTHER PUBLICATIONS

British Search Report dated Nov. 17, 2008.
Office Action dated Jul. 14, 2009 on a corresponding British patent application.
Office Action dated Jul. 31, 2009 on a corresponding Chinese patent application with English translation.

* cited by examiner

*Primary Examiner*—David P Porta
*Assistant Examiner*—Casey Bryant
(74) *Attorney, Agent, or Firm*—Dickinson Wright PLLC

(57) ABSTRACT

A first band pass filter selects and transmits light having an infrared wavelength specific to flame. A first infrared-ray receiving element receives the light from the first band pass filter. A second band pass filter selects and transmits light having an infrared wavelength which is not the infrared wavelength specific to flame. A second infrared-ray receiving element receives the light from the second band pass filter. A first output of the first infrared-ray receiving element is compared with a second output of the second infrared-ray receiving element to detect the flame. When light having homogeneous energy in a transmissive wavelength band of the first band pass filter and a transmissive wavelength band of the second band pass filter is incident on the first band pass filter and the second band pass filter, an amount of the light transmitted through the second band pass filter is less than an amount of the light transmitted through the first band pass filter, and the first output and the second output are adjusted so that a level of the first output is equal to a level of the second output.

9 Claims, 12 Drawing Sheets

RELATION OF BAND PASS FILTER

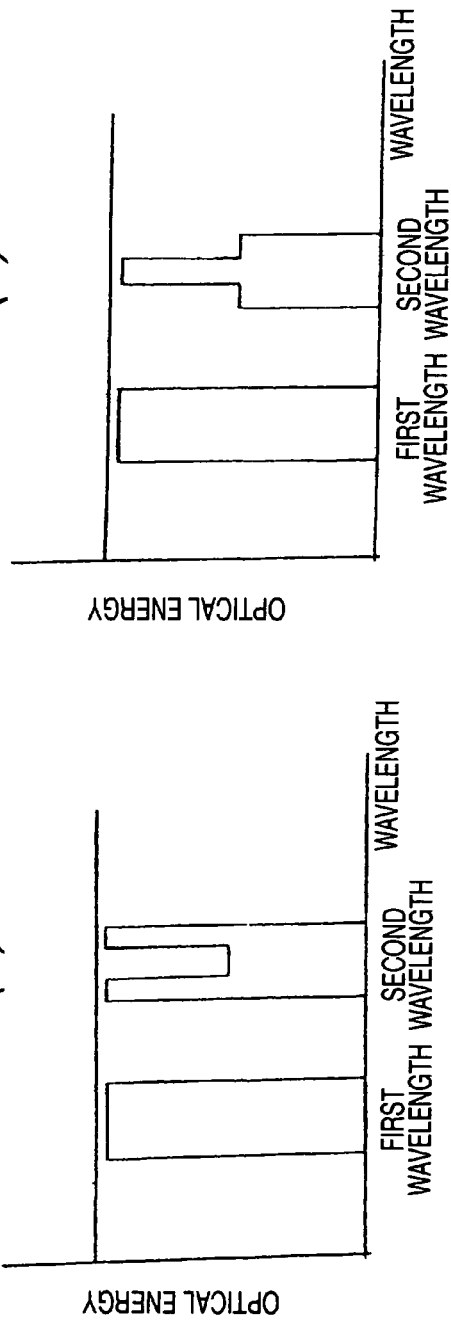
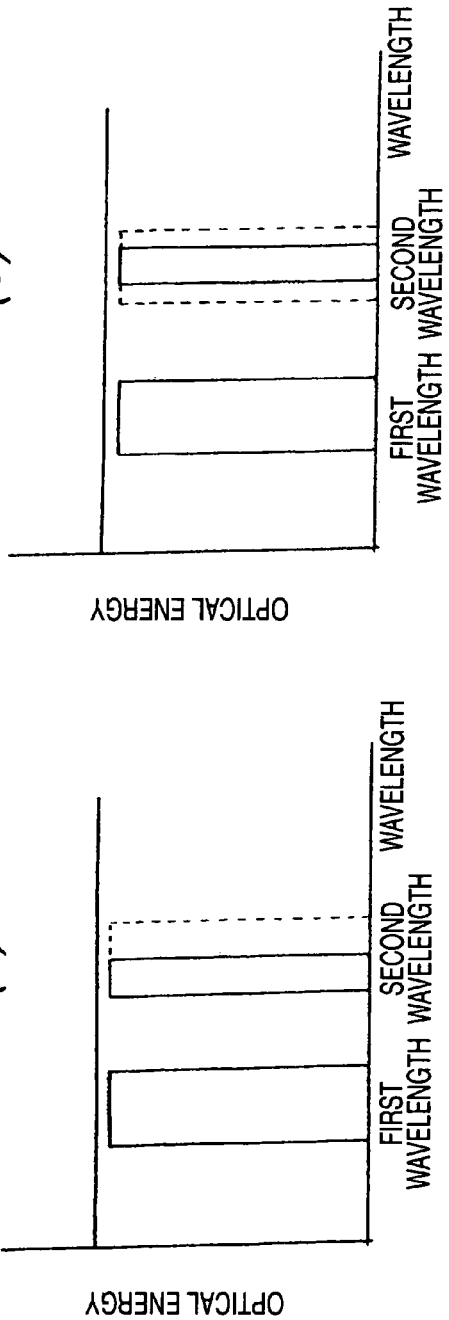

RELATION OF SENSITIVITY ADJUSTMENT

OUTPUTS IN DETECTION OF FLAME

FLAME DETECTOR

Priority is claimed to Japanese Patent Application No. 2007-137532 filed on May 24, 2007, the disclosure of which, including the specification, drawings and claims, is incorporated herein by reference in its entirety.

BACKGROUND

The present invention relates to a flame detector.

As shown in FIG. 1, the related-art flame detector includes a first band pass filter 53a for transmitting infrared rays of, for example, about 4.4 to 4.5 μm, which are in a wavelength band of $CO_2$ resonance radiation, a first infrared-ray receiving element (infrared-ray receiving sensor) 53b for receiving light from the first band pass filter 53a, a second band pass filter 54a for transmitting infrared rays of about 5.0 μm, which are in the vicinity of the wavelength band of $CO_2$ resonance radiation, and a second infrared-ray receiving element (infrared-ray receiving sensor) 54b for receiving light from the second band pass filter 54a. A common protective glass 52 made of a member having infrared translucency such as sapphire glass is provided on the front surface of the first band pass filter 53a and the second band pass filter 54a.

With such a configuration, a sensor output based on the infrared ray of about 4.4 to 4.5 μm set in the first band pass filter 53a is generated from the first infrared-ray receiving element 53b. Moreover, a sensor output based on the infrared ray of about 5.0 μm set in the second band pass filter 54a is generated from the second infrared-ray receiving element 54b. The sensor output of the first infrared-ray receiving element 53b and the sensor output of the second infrared-ray receiving element 54b are amplified by amplifiers 55 and 56, respectively, and then a comparator 57 compares the sensor outputs to detect flame.

That is, as shown in FIG. 2, a relative intensity of the flame is the highest in the wavelength band (first wavelength band) of about 4.4 to 4.5 μm set in the first band pass filter 53a, and the relative intensity of the flame is the smallest in the wavelength band (second wavelength) of about 5.0 μm set in the second band pass filter 54a. Accordingly, it is possible to detect the flame when the sensor output of the first infrared-ray receiving element 53b is larger than that of the second infrared-ray receiving element 54b.

In this case, the sapphire glass used in the protective glass 52 transmits light of about 0.3 to 7.6 μm. That is, since the sapphire glass used in the protective glass 52 also transmits the visible light and the near-infrared rays as well as the infrared rays, the visible light and the near-infrared rays are directly emitted to the first band pass filter 53a and the second band pass filter 54a. In this case, in the first band pass filter 53a and the second band pass filter 54a, an optical energy (that is, the optical energy of the visible light and the near-infrared rays) outside the transmissive band is converted into heat, and thus is emitted as secondary radiation to the surroundings.

As shown in FIG. 1, the known flame detector has a problem in that the known flame detector may also detect the visible light and the near-infrared rays which are not originally transmitted through the band pass filters since the first infrared-ray receiving element 53b and the second infrared-ray receiving element 54b detect the secondary radiation.

In particular, in an environment where the flame detector is installed, there are factors causing a false alarm due to sunlight, an electric bulb, or the like. Accordingly, since the flame may be much affected by the visible light and the near-infrared rays emitted from the sunlight, the electric bulb, or the like, there arises a problem in that the flame cannot be detected with good accuracy.

This problem also arises in a one-wavelength type flame detector for detecting flame based on the infrared rays of about 4.4 to 4.5 μm or a multi-wavelength type flame detector.

In the past, a technique disclosed in Patent Document 1 was devised to solve this problem (that is, to prevent the influence (for example, the false alarm) caused due to the secondary radiation). That is, in Patent Document 1, a deposition film for cutting the visible light and the near-infrared rays is formed on the rear surface of the protective glass in order to prevent the visible light and the near-infrared rays from being incident on the first band pass filter and the second band pass filter.

Patent Document 1: Japanese Patent Publication No. 2006-98372A

Like Patent Document 1, when the protective glass has a function for cutting the visible light and the near-infrared rays to prevent the visible light and the near-infrared rays from being incident on the first band pass filter and the second band pass filter, the influence (for example, the false alarm) caused due to the secondary radiation can be prevented. However, there arises a problem in that sensitivity for detecting the flame may deteriorate since attenuation occurs as much as light transmitted through the protective glass, thereby reducing an amount of light transmitted through the first band pass filter and the second band pass filter.

SUMMARY

It is therefore an object of at least one embodiment of the present invention to provide a flame detector capable of detecting flame with good accuracy while preventing the influence (for example, the false alarm) caused by the secondary radiation without deterioration of the sensitivity for detecting the flame.

In order to achieve the above-described object, according to an aspect of at least one embodiment of the present invention, there is provided a flame detector, comprising: a first band pass filter for selecting and transmitting light having an infrared wavelength specific to flame; a first infrared-ray receiving element for receiving the light from the first band pass filter; a second band pass filter for selecting and transmitting light having an infrared wavelength which is not the infrared wavelength specific to flame; a second infrared-ray receiving element for receiving the light from the second band pass filter; wherein a first output of the first infrared-ray receiving element is compared with a second output of the second infrared-ray receiving element to detect the flame; wherein when light having homogeneous energy in a transmissive wavelength band of the first band pass filter and a transmissive wavelength band of the second band pass filter (specifically, the light having the homogeneous energy without wavelength dependency in a wavelength band from 4.0 to 5.0 μm, for example) is incident on the first band pass filter and the second band pass filter, an amount of the light transmitted through the second band pass filter is less than an amount of the light transmitted through the first band pass filter, and the first output and the second output are adjusted so that a level of the first output is equal to a level of the second output.

A half bandwidth of the second band pass filter may be narrower than a half bandwidth of the first band pass filter.

An attenuation rate of the light transmitted through the second band pass filter may be larger (higher) than an attenuation rate of the light transmitted through the first band pass filter.

The flame detector may further comprise an adjusting unit that adjusts a first sensitivity of the first infrared-ray receiving element and a second sensitivity of the second infrared-ray receiving element, wherein the adjusting unit adjusts the second sensitivity to be higher than the first sensitivity so as to cancel (compensate) a difference between the amount of the light transmitted through the second band pass filter and the amount of the light transmitted through the first band pass filter when the light having homogeneous energy in the transmissive wavelength band of the first band pass filter and the transmissive wavelength band of the second band pass filter (specifically, the light having the homogeneous energy without wavelength dependency in a wavelength band from 4.0 to 5.0 μm, for example) is incident on the first band pass filter and the second band pass filter.

The flame detector may further comprise an adjusting unit that adjusts a first gain at which the first output is amplified and a second gain at which the second output is amplified, wherein the adjusting unit adjusts the second gain to be larger (higher) than the first gain so as to cancel (compensate) a difference between the amount of the light transmitted through the second band pass filter and the amount of the light transmitted through the first band pass filter when the light having homogeneous energy in the transmissive wavelength band of the first band pass filter and the transmissive wavelength band of the second band pass filter (specifically, the light having the homogeneous energy without wavelength dependency in a wavelength band from 4.0 to 5.0 μm, for example) is incident on the first band pass filter and the second band pass filter.

The flame detector may further comprise an adjusting unit that adjusts a correction level, wherein the level of the second output is set higher than the level of the first output by the correction level so as to cancel (compensate) a difference between the amount of the light transmitted through the second band pass filter and the amount of the light transmitted through the first band pass filter when the light having homogeneous energy in the transmissive wavelength band of the first band pass filter and the transmissive wavelength band of the second band pass filter (specifically, the light having the homogeneous energy without wavelength dependency in a wavelength band from 4.0 to 5.0 μm, for example) is incident on the first band pass filter and the second band pass filter.

A second sensitivity of the second infrared-ray receiving element may be higher than a first sensitivity of the first infrared-ray receiving element.

A second gain at which the second output may be amplified is larger (higher) than a first gain at which the first output is amplified.

The level of the second output may be set higher than the level of the first output by a predetermined level.

With the above configuration, it is possible to detect the flame with good accuracy while preventing an influence (for example, a false alarm) caused due to secondary radiation without deterioration of sensitivity for detecting the flame.

BRIEF DESCRIPTION OF THE DRAWINGS

The above objects and advantages of the present invention will become more apparent by describing in detail exemplary embodiments thereof with reference to the accompanying drawings, wherein:

FIG. 7($a$) to 7($d$) are diagrams for explaining a configuration example of the transmissive amount adjusting means;

DETAILED DESCRIPTION OF THE EMBODIMENTS

Hereinafter, a preferred embodiment of the invention will be described with reference to the drawings.

Figure 1:
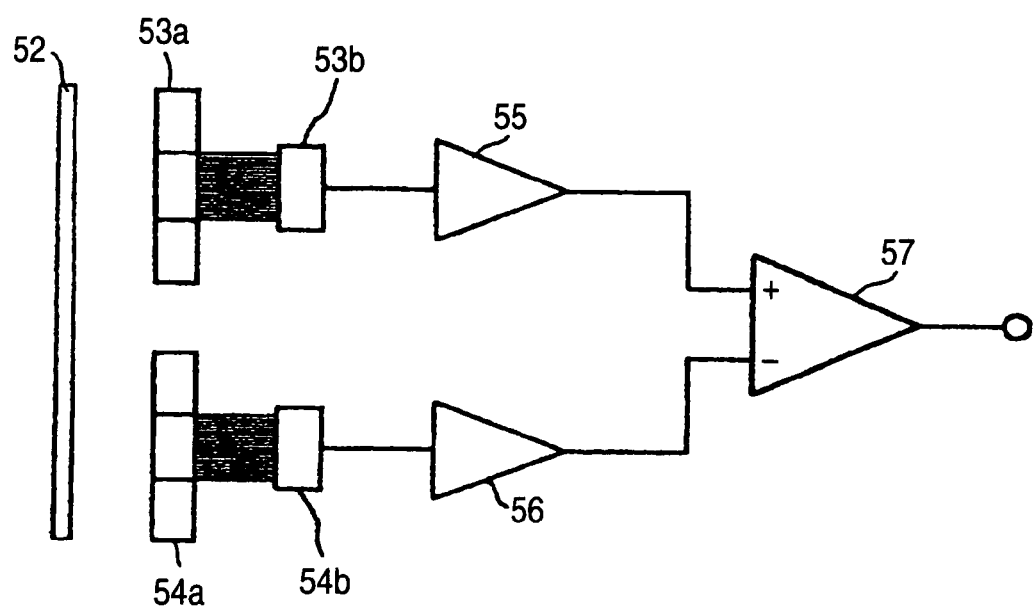
FIG. 1 is a diagram illustrating a configuration example of a known flame detector.
Figure 2:
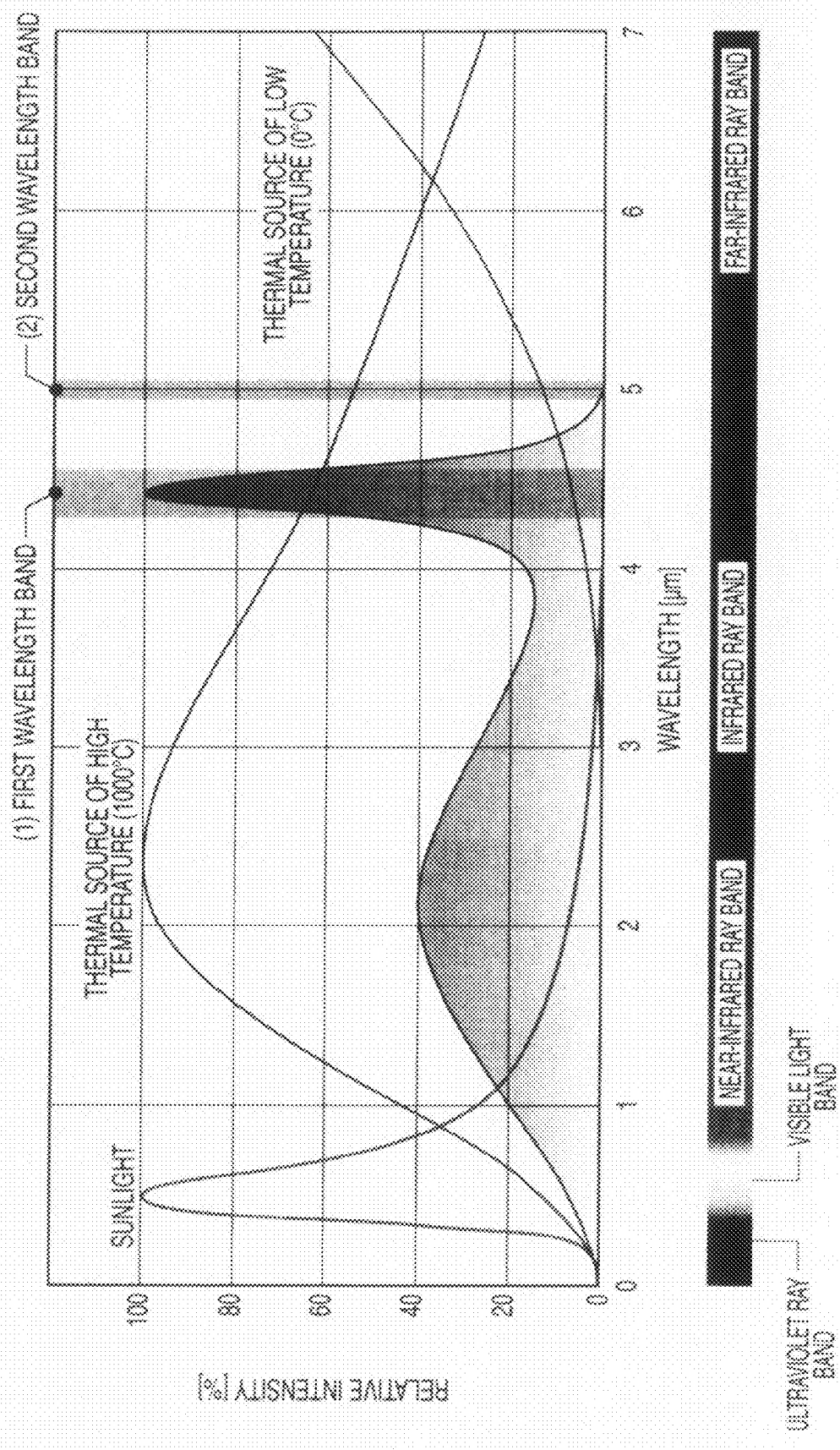
FIG. 2 is a diagram illustrating a relative intensity of a spectrum for a wavelength of various thermal sources.
Figure 3:
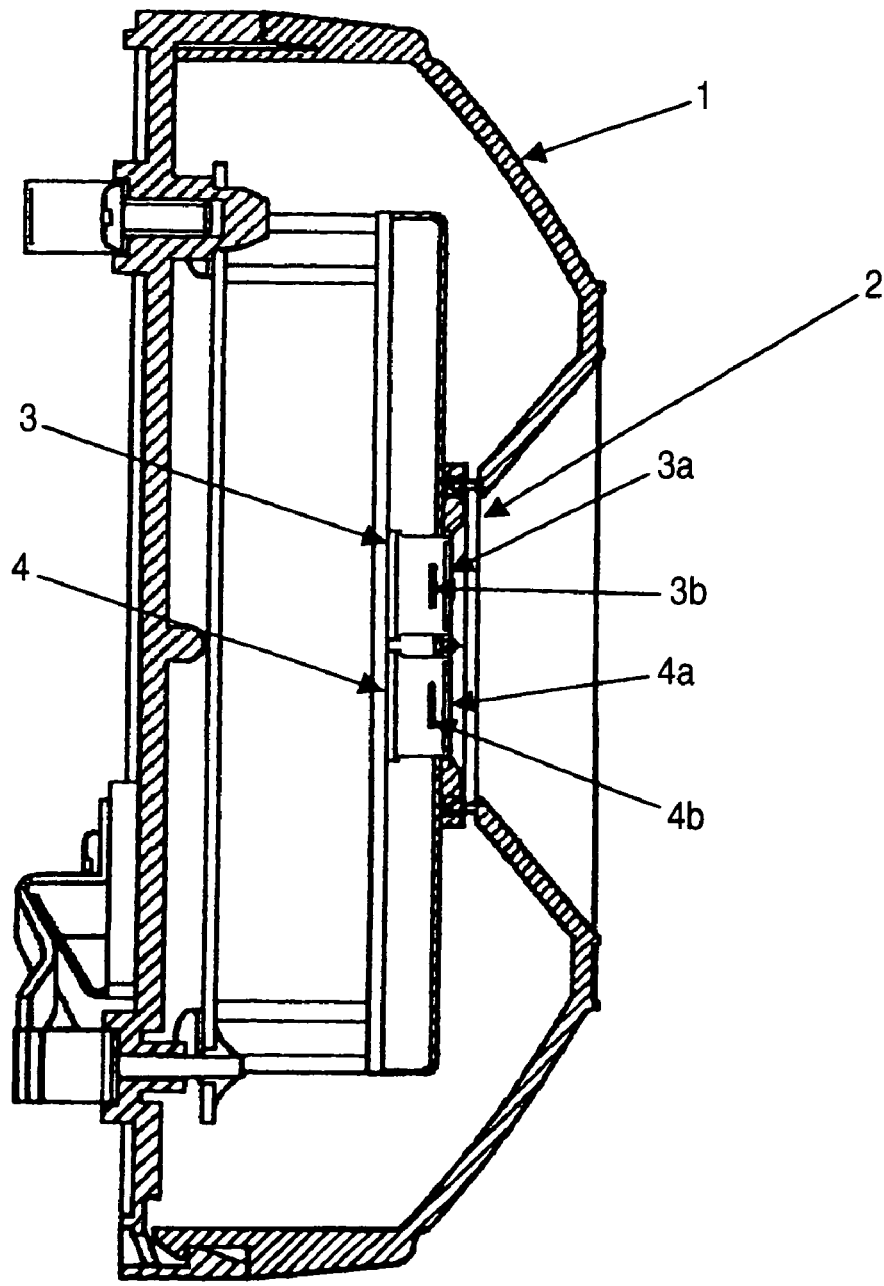
FIG. 3 is a diagram illustrating a configuration example of a flame detector according to the invention.
Figure 4:
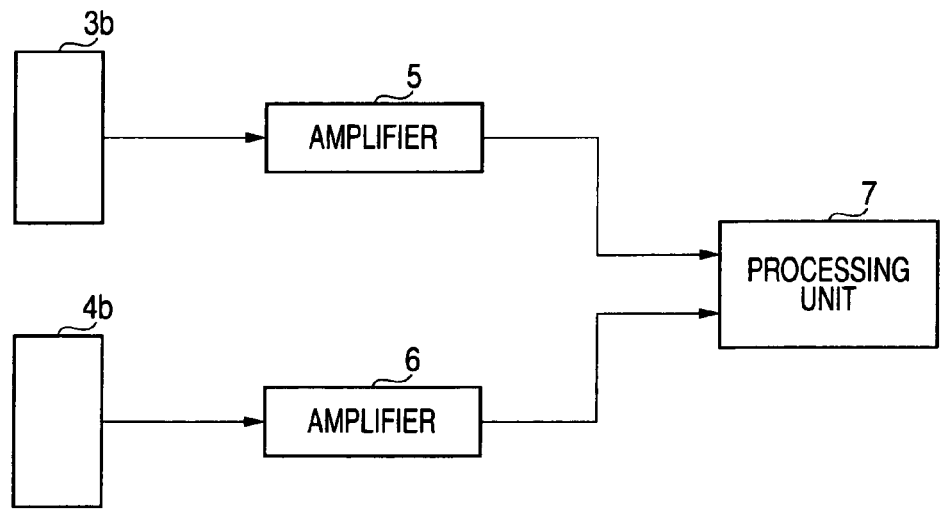
FIG. 4 is a diagram illustrating the configuration example of the flame detector according to the invention.

FIGS. 3 and 4 are diagrams illustrating a configuration example of a flame detector related to the invention.

With reference to FIG. 3, the flame detector related to the invention includes a main body (case) 1, a protective glass 2 for an opening of the main body 1, and a first element case 3 and a second element case 4 provided in the main body 1.

In this case, the protective glass 2 is formed of a member such as sapphire glass having infrared translucency.

In the first element case 3, there is a first band pass filter 3$a$ which selects and transmits light having an infrared wavelength specific to flame (for example, the first band pass filter 3$a$ passes infrared rays with a wavelength band (first wavelength band) from about 4.4 to 4.5 μm, which are in a wavelength band of $CO_2$ resonance radiation) and a first infrared-ray receiving element 3$b$ which receives the light (where the light from the first band pass filter 3$a$ includes the light transmitted through the first band pass filter 3$a$ and secondary radiation from the first band pass filter 3$a$) from the first band pass filter 3$a$.

In the second element case 4, there is a second band pass filter 4$a$ which selects and transmits light having an infrared wavelength which is not the infrared wavelength specific to the flame (for example, the second band pass filter 4$a$ passes infrared rays with a wavelength band (second wavelength band) of about 5.0 μm, which is in the vicinity of a wavelength band of $CO_2$ resonance radiation) and a second infrared-ray receiving element 4b which receives the light (where the light from the second band pass filter 4a includes the light transmitted through the second band pass filter 4a and secondary radiation from the second band pass filter 4a) from the second band pass filter 4a.

The first band pass filter 3a and the second band pass filter 4a are formed of a silicon material (base material), for example.

A pyroelectric infrared sensor is used as the first infrared-ray receiving element 3b and the second infrared-ray receiving element 4b, for example. The pyroelectric infrared sensor is a sensor which detects an infrared energy radiated from all objects by using a pyroelectric property of a pyroelectric substance. Since the pyroelectric infrared sensor has a wide range of a wavelength sensitivity and excellent properties such as non-wavelength dependency, various temperature sensors can be made just by distinguishing optical filters to be used. Examples of a material of the pyroelectric infrared sensor include PZT series (lead zirconate titanate), $LiTaO_3$ series (tantalic acid lithium), PVF2, and $PbTaO_3$.

As shown in FIG. 4, the output of the first infrared-ray receiving element 3b is amplified by an amplifying unit (for example, Op Amp) 5, for example, and the output of the second infrared-ray receiving element 4b is amplified by an amplifying unit (for example, Op Amp) 6, for example. The respective outputs are input to a processing unit 7.

The processing unit 7 compares the output of the first infrared-ray receiving element 3b (in an example of FIG. 4, the output of the amplifying unit 5) and the output of the second infrared-ray receiving element 4b (in the example of FIG. 4, the output of the amplifying unit 6) to detect flame.

According to the invention, in order to detect the flame with good precision while preventing an influence (for example, a false alarm) caused by the secondary radiation without deterioration of sensitivity for detecting the flame, there is provided a transmissive amount adjusting means which allows an amount of light transmitted through the second band pass filter 4a to be smaller than an amount of light transmitted through the first band pass filter 3a when light (specifically, the light having the homogeneous energy without wavelength dependency in a wavelength band from 4.0 to 5.0 µm, for example) having the homogeneous energy in a transmissive wavelength band (first wavelength band) of the first band pass filter 3a and a transmissive wavelength band (second wavelength band) of the second band pass filter 4a is incident on the first band pass filter 3a and the second band pass filter 4a, respectively. Moreover, there is provided an output adjusting means 8 which adjusts the output of the first infrared-ray receiving element 3b and the output of the second infrared-ray receiving element 4b so that a level of the output of the first infrared-ray receiving element 3b is the same as that of the output of the second infrared-ray receiving element 4b when the light (specifically, light having the homogeneous energy without wavelength dependency in a wavelength band from 4.0 to 5.0 µm, for example) having the homogeneous energy in a transmissive wavelength band (first wavelength band) of the first band pass filter 3a and a transmissive wavelength band (second wavelength band) of the second band pass filter 4a is incident on the first band pass filter 3a and the second band pass filter 4a, respectively.

Figure 5:
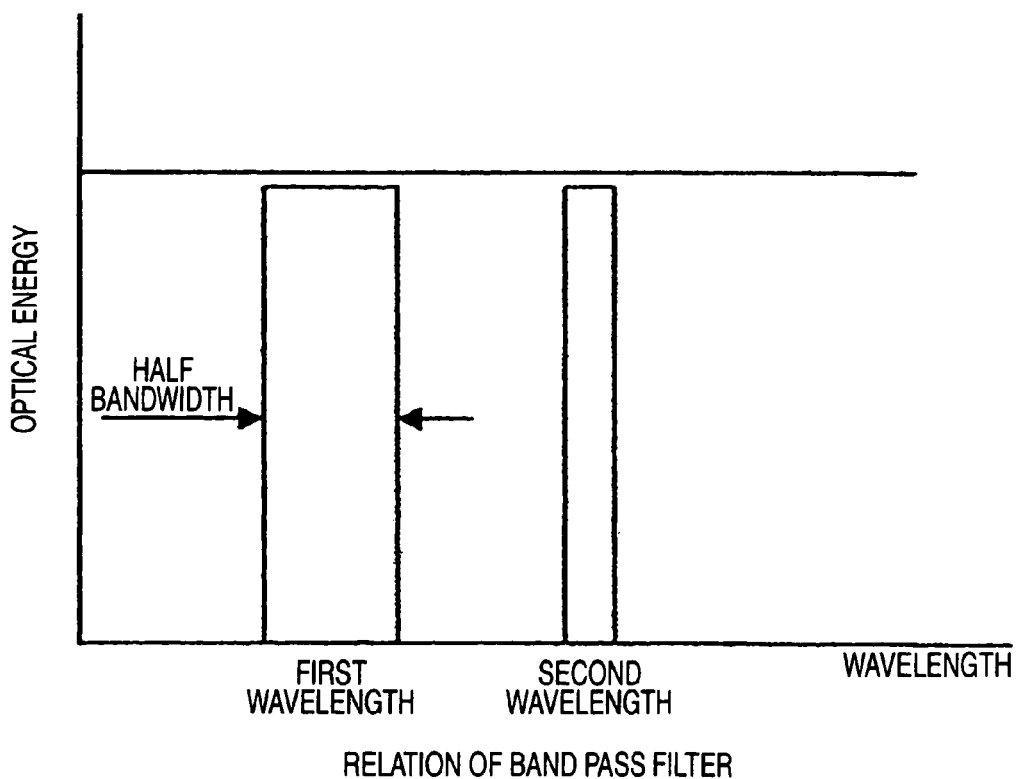
FIG. 5 is a diagram for explaining a configuration example of a transmissive amount adjusting means.
Figure 6:
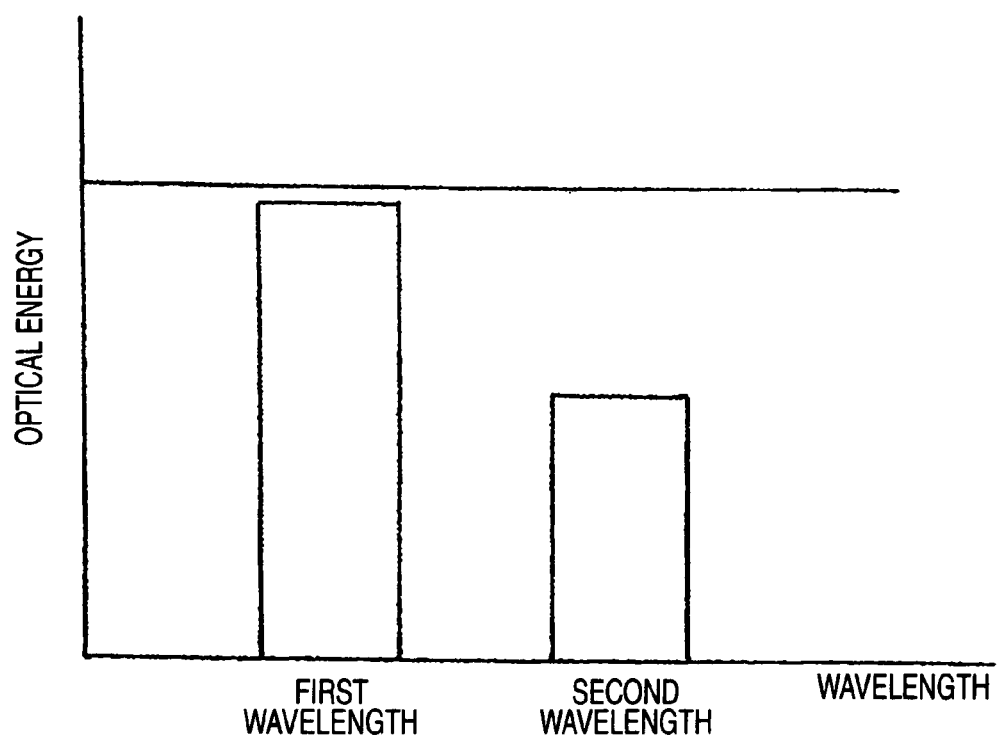
FIG. 6 is a diagram for explaining a configuration example of the transmissive amount adjusting means.

As shown in FIG. 5, the transmissive amount adjusting means can be configured so that a half bandwidth of the second band pass filter 4a is narrower than that of the first band pass filter 3a. Alternatively, as shown in FIG. 6, the transmissive amount adjusting means may be configured so that an attenuation rate of the light of the second band pass filter 4a is larger (higher) than that of the light of the first band pass filter 3a.

The half bandwidth refers to a quality used to show a filter property, to be brief, refers to a wavelength width of transmitted light. As the half bandwidth is broader, the light in broader wavelength band is transmitted. In contrast, as the half bandwidth is narrower, the light in limited wavelength band is transmitted. Specifically, the half bandwidth is defined as a wavelength difference between the shortest wavelength and the longest wavelength which is a half of the highest value of the intensity in the transmissive wavelength band.

In order to allow the attenuation rate of the light of the second band pass filter 4a to be larger (higher) than that of the first band pass filter 3a, it is necessary for the second band pass filter 4a to have a function for attenuating an amount of transmissive light at least in a part of the transmissive wavelength (second wavelength band) of the second band pass filter 4a. In the example of FIG. 6, an amount of transmissive light is attenuated in the entire wavelength band of the transmissive wavelength band (second wavelength band) of the second band pass filter 4a. However, as shown in FIGS. 7(a) to (d), for example, the amount of transmissive light may be attenuated at least in the part of the transmissive wavelength (second wavelength band) of the second band pass filter 4a. In addition, in examples of FIGS. 7(c) and (d), the amount of transmissive light is attenuated up to "0" in a part of the wavelength band. The example of FIG. 7(d) has the substantially same configuration as the configuration in which the half bandwidth of the second band pass filter 4a is narrower than the half bandwidth of the first band pass filter 3a.

The output adjusting means 8 may allow the sensitivity of the second infrared-ray receiving element 4b to be higher than the sensitivity of the first infrared-ray receiving element 3b so as to offset (compensate) the difference between the amount of light transmitted through the second band pass filter 4a and the amount of light transmitted through the first band pass filter 3a when the light (specifically, the light having the homogeneous energy without wavelength dependency in a wavelength band from 4.0 to 5.0 µm, for example) having the homogeneous energy in the transmissive wavelength band (first wavelength band) of the first band pass filter 3a and the transmissive wavelength band (second wavelength band) of the second band pass filter 4a is incident on the first band pass filter 3a and the second band pass filter 4a, respectively. More specifically, the output adjusting means 8 may amplify the output of the second infrared-ray receiving element 4b at a gain larger (higher) than that of the output of the first infrared-ray receiving element 3b so as to offset (compensate) the difference between the amount of light transmitted through the second band pass filter 4a and the amount of light transmitted through the first band pass filter 3a, when the light (specifically, the light having the homogeneous energy without wavelength dependency in a wavelength band from 4.0 to 5.0 µm, for example) having the homogeneous energy in the transmissive wavelength band (first wavelength band) of the first band pass filter 3a and the transmissive wavelength band (second wavelength band) of the second band pass filter 4a is incident on the first band pass filter 3a and the second band pass filter 4a, respectively.

Figure 8:
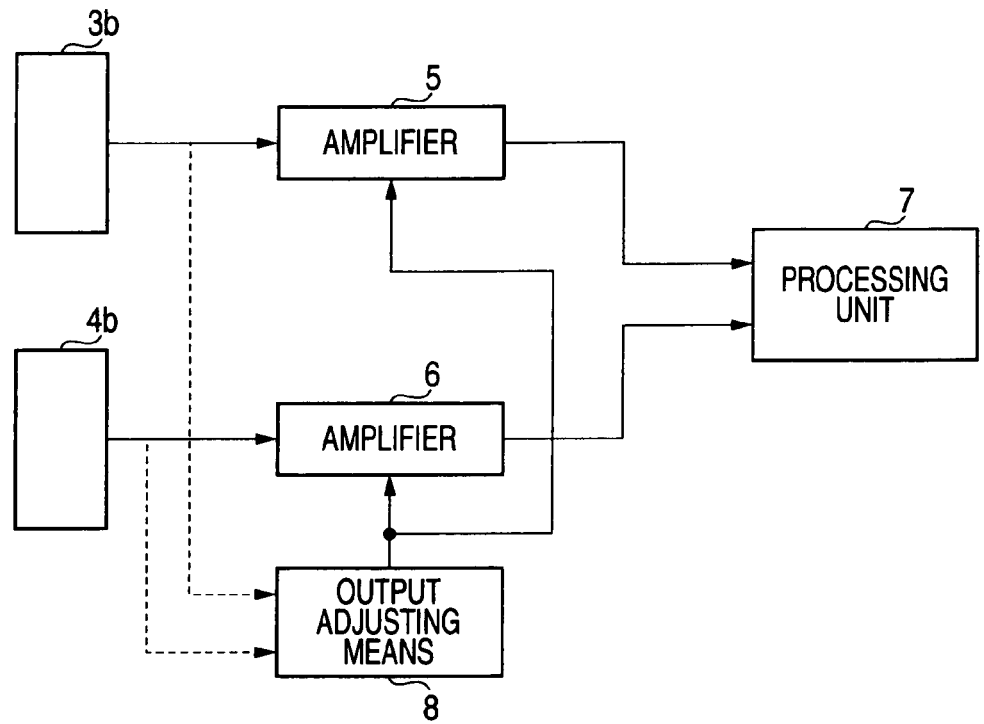
FIG. 8 is a diagram for explaining a configuration example of an output adjusting means.
Figure 9:
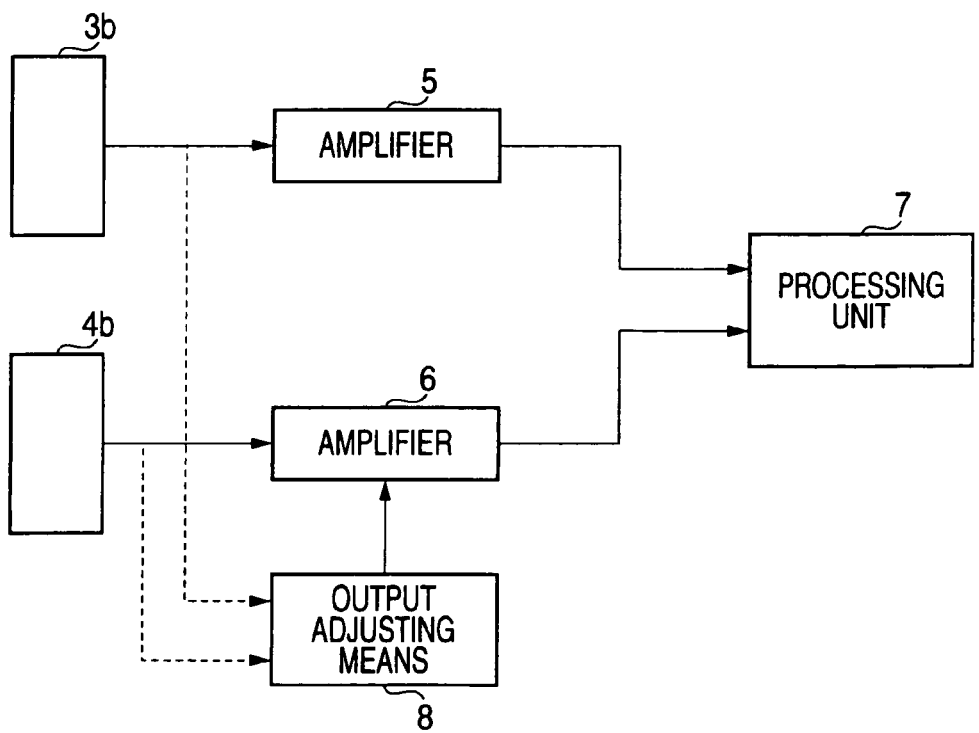
FIG. 9 is a diagram for explaining a configuration example of the output adjusting means.

FIGS. 8 and 9 are diagrams showing specific configuration examples when the output adjusting means 8 is configured so as to have the above-described configuration (that is, the sensitivity of the second infrared-ray receiving element 4b is set to be higher than the sensitivity of the first infrared-ray receiving element 3b).

With reference to FIG. 8, the output adjusting means 8 is configured so as to adjust (increase) the gains of amplifiers 5 and 6 in accordance with the output of the first infrared-ray receiving element 3b and the second infrared-ray receiving element 4b in the configuration shown in FIG. 4. In the example shown in FIG. 9, specifically, the output adjusting means 8 is configured so as to adjust (increase) the gain of the amplifier 6 in accordance with the output of the first infrared-ray receiving element 3b and the second infrared-ray receiving element 4b in the configuration shown in FIG. 4.

In the case of the configurations shown in FIGS. 8 and 9, the output adjusting means 8 may be configured so as to manually adjust the gains of the amplifiers 5 and 6 in accordance with the output of the first infrared-ray receiving element 3b and the second infrared-ray receiving element 4b. Alternatively, the output adjusting means 8 may be configured so as to automatically (for example, by control of a CPU) adjust the gains of the amplifiers 5 and 6 in accordance with the output of the first infrared-ray receiving element 3b and the second infrared-ray receiving element 4b.

As another configuration example, the output adjusting means 8 may be configured in a way in which the output of the second infrared-ray receiving element 4b is set in advance higher by a predetermined amount of compensation than that of the first infrared-ray receiving element 3b so as to offset (compensate) a difference between the amount of light transmitted through the second band pass filter 4a and the amount of light transmitted through the first band pass filter 3a, when the light (specifically, the light having the homogeneous energy without wavelength dependency in a wavelength band from 4.0 to 5.0 µm, for example) having the homogeneous energy in the transmissive wavelength band (first wavelength band) of the first band pass filter 3a and the transmissive wavelength band (second wavelength band) of the second band pass filter 4a is incident on the first band pass filter 3a and the second band pass filter 4a, respectively.

Figure 10:
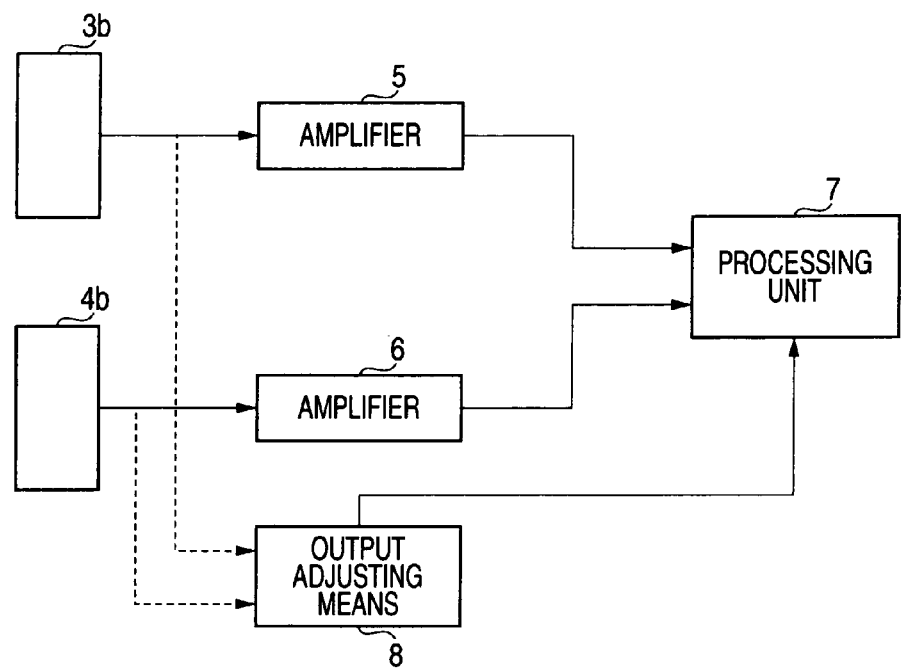
FIG. 10 is a diagram for explaining a configuration example of the output adjusting means.
Figure 11:
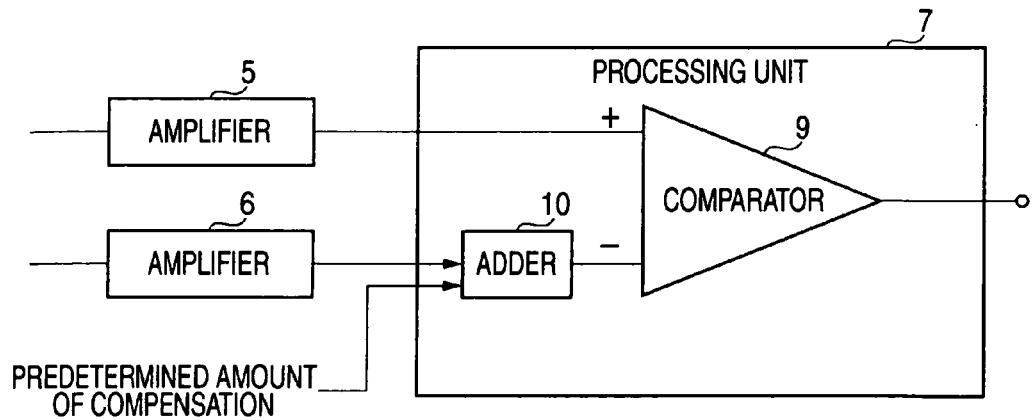
FIG. 11 is a diagram for explaining a configuration example of the output adjusting means.

FIGS. 10 and 11 are diagrams showing specific configuration examples where the output adjusting means 8 is configured in the above-described way (that is, the case where the output of the second infrared-ray receiving element 4b is set in advance higher by a predetermined amount of compensation than that of the first infrared-ray receiving element 3b).

With reference to FIG. 10, the output adjusting means 8 is configured so as to adjust a predetermined compensation value of the processing unit 7 in accordance with the outputs of the first infrared-ray receiving element 3b and the second infrared-ray receiving element 4b in the configuration shown in FIG. 4. In the example shown in FIG. 11, the output adjusting means 8 is configured so that an adder 10 adds the predetermined compensation value to the output of the amplifier 6 on a side where the output is input from the amplifier 6 of a comparator 9 of the processing unit 7.

In the case of the configurations of FIGS. 10 and 11, the output adjusting means 8 may be configured so as to manually adjust the predetermined value of the processing unit 7 in accordance with the output of the first infrared-ray receiving element 3b and the second infrared-ray receiving element 4b. Alternatively, the output adjusting means 8 may be configured so as to automatically (for example, by control of the CPU) adjust the predetermined value of the processing unit 7 in accordance with the output of the first infrared-ray receiving element 3b and the second infrared-ray receiving element 4b.

Next, an operation of the flame detector having the above-described configuration will be described according to the invention. In the following description, the transmissive amount adjusting means is configured so that the half bandwidth of the second band pass filter 4a is narrower than that of the first band pass filter 3a, for convenience. In addition, the output adjusting means 8 allows the sensitivity of the second infrared-ray receiving element 4b to be higher than the sensitivity of the first infrared-ray receiving element 3b (more specifically, amplifies the output of the second infrared-ray receiving element 4b at a gain larger (higher) than that of the output of the first infrared-ray receiving element 3b) so as to offset (compensate) the difference between the amount of light transmitted through the second band pass filter 4a and the amount of light transmitted through the first band pass filter 3a, when the light (specifically, the light having the homogeneous energy without wavelength dependency in a wavelength band from 4.0 to 5.0 µm, for example) having the homogeneous energy in the transmissive wavelength band (first wavelength band) of the first band pass filter 3a and the transmissive wavelength band (second wavelength band) of the second band pass filter 4a is incident on the first band pass filter 3a and the second band pass filter 4a, respectively.

In this flame detector, the half bandwidth of the second band pass filter 4a is smaller than that of the first band pass filter 3a when the light (specifically, the light having the homogeneous energy without wavelength dependency in a wavelength band from 4.0 to 5.0 µm, for example) having the homogeneous energy in the transmissive wavelength band (first wavelength band) of the first band pass filter 3a and the transmissive wavelength band (second wavelength band) of the second band pass filter 4a is incident on the first band pass filter 3a and the second band pass filter 4a, respectively. Therefore, the amount of light transmitted through the second band pass filter 4a becomes smaller than that transmitted through the first band pass filter 3a. As a result, an amount of light received by the second infrared-ray receiving element 4b becomes smaller than that received by the first infrared-ray receiving element 3b, and the output of the second infrared-ray receiving element 4b becomes smaller than that of the first infrared-ray receiving element 3b. For that reason, in order to make the output from the second infrared-ray receiving element 4b the same as that from the first infrared-ray receiving element 3b, it is necessary to adjust the output of the second infrared-ray receiving element 4b so as to be larger than that of the first infrared-ray receiving element 3b.

Figure 12:
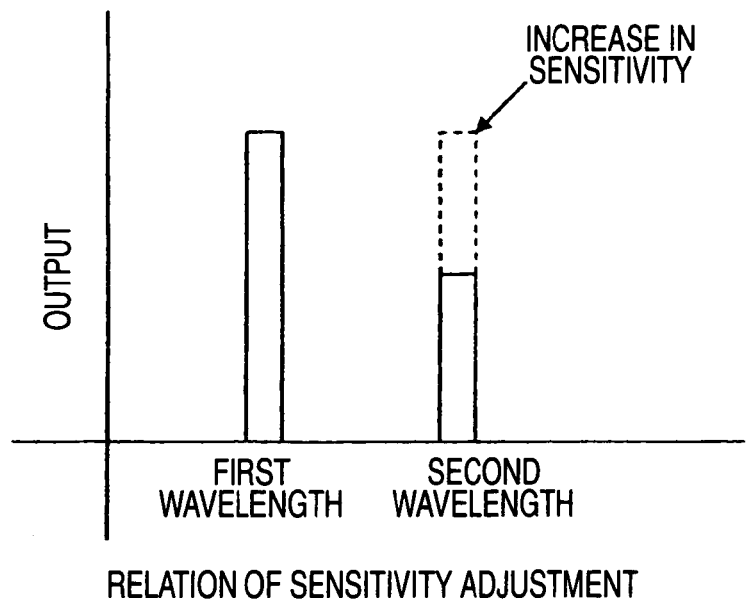
FIG. 12 is a diagram illustrating a relation of sensitivity adjustment.

FIG. 12 shows a relation of the sensitivity adjustment for making the output from the second infrared-ray receiving element 4b the same as that from the first infrared-ray receiving element 3b, when the light (specifically, the light having the homogeneous energy without wavelength dependency in a wavelength band from 4.0 to 5.0 µm, for example) having the homogeneous energy in the transmissive wavelength band (first wavelength band) of the first band pass filter 3a and the transmissive wavelength band (second wavelength band) of the second band pass filter 4a is incident on the first band pass filter 3a and the second band pass filter 4a, respectively.

Figure 13:
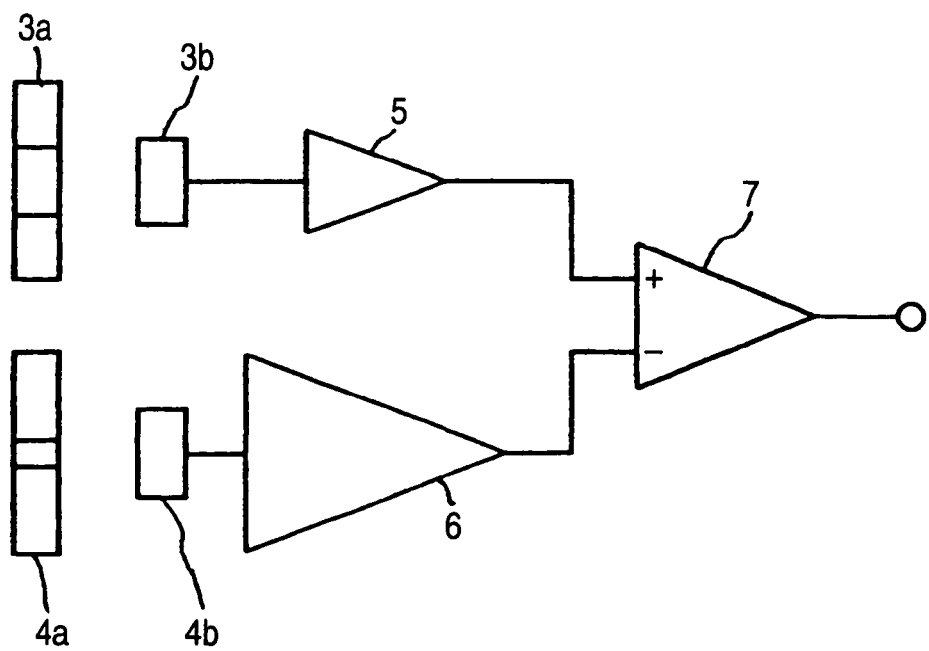
FIG. 13 is a diagram for explaining the sensitivity adjustment.

As shown in FIG. 13, this sensitivity adjustment is performed by amplifying the output of the second infrared-ray receiving element 4b at the gain larger (higher) than that of the output of the first infrared-ray receiving element 3b so as to offset (compensate) the difference between the amount of light transmitted through the second band pass filter 4a and the amount of transmissive light transmitted through the first band pass filter 3a, when the light (specifically, the light having the homogeneous energy without wavelength dependency in a wavelength band from 4.0 to 5.0 µm, for example) having the homogeneous energy in the transmissive wavelength band (first wavelength band) of the first band pass filter 3a and the transmissive wavelength band (second wavelength band) of the second band pass filter 4a is incident on the first band pass filter 3a and the second band pass filter 4a, respectively.

Figure 14:
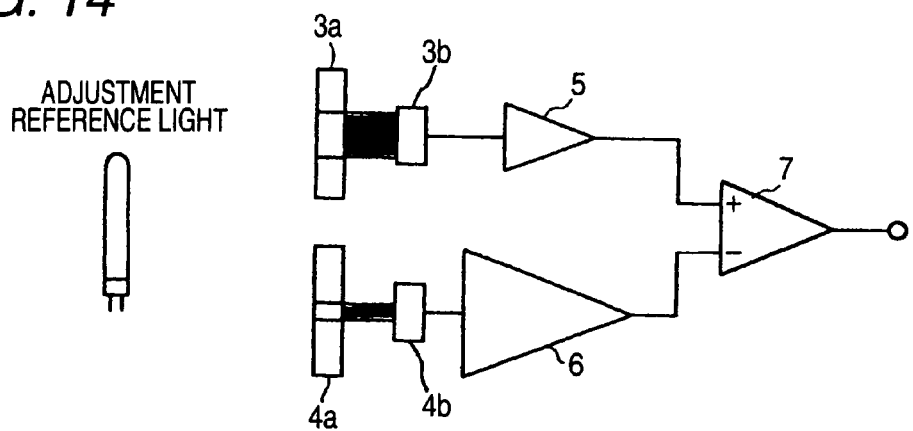
FIG. 14 is a diagram illustrating an example of a method of the sensitivity adjustment.

FIG. 14 shows an example of the sensitivity adjustment. In the example shown in FIG. 14, a light source for emitting adjustment reference light is used. The sensitivity adjustment is performed by allowing the adjustment reference light from the light source to be incident on the first band pass filter 3a and the second band pass filter 4a and amplifying the output of the second infrared-ray receiving element 4b at the gain larger (higher) than that of the output of the first infrared-ray receiving element 3b so as to offset (compensate) a difference between the amount of light transmitted through the second band pass filter 4a and the amount of light transmitted through the first band pass filter 3a.

Figure 15:
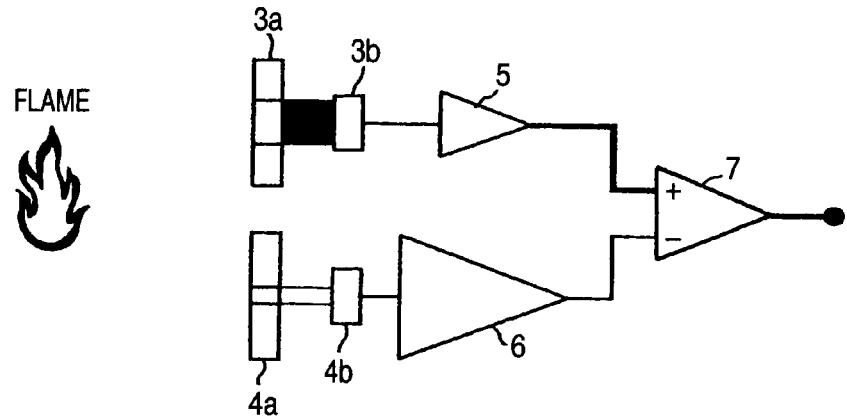
FIG. 15 is a diagram for explaining an example where the flame detector detects flame according to the invention.
Figure 16:
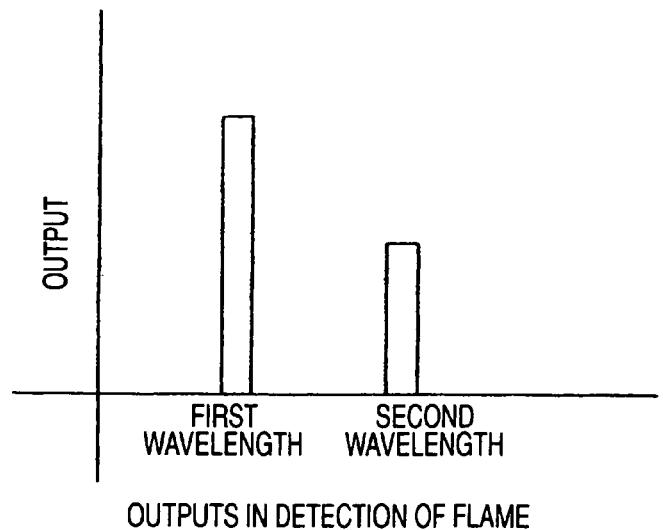
FIG. 16 is a diagram for explaining the example where the flame detector detects flame according to the invention.

In the flame detector subjected to the sensitivity adjustment shown in FIGS. 13 and 14, as shown in FIG. 15, since the wavelength of light from flame is in an infrared ray of a wavelength band of $CO_2$ resonance radiation, for example, about 4.4 to 4.5 μm, the amount of light transmitted through the first band pass filter 3a is larger than that transmitted through the second band pass filter 4a when the flame is generated. Moreover, since the half bandwidth of the second band pass filter 4a is narrower than that of the first band pass filter 3a, the amount of light transmitted through the first band pass filter 3a is much larger than that transmitted through the second band pass filter 4a. Therefore, as shown in FIG. 16, since the output of the first infrared-ray receiving element 3b is much larger than that of the second infrared-ray receiving element 4b, the output from the amplifier 5 becomes larger than that from the amplifier 6, even though the gain of the amplifier 6 is set to be larger (higher) than that of the amplifier 5. With such a configuration, the output of the comparator becomes "1" (high), thereby surely detecting the flame.

Figure 17:
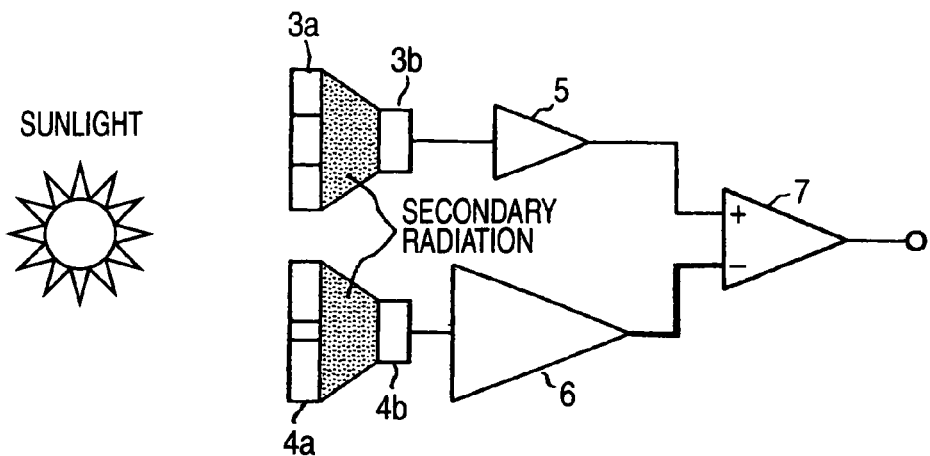
FIG. 17 is a diagram for explaining prevention of an influence false alarm) caused by secondary radiation in the flame detector according to the invention.
Figure 18:
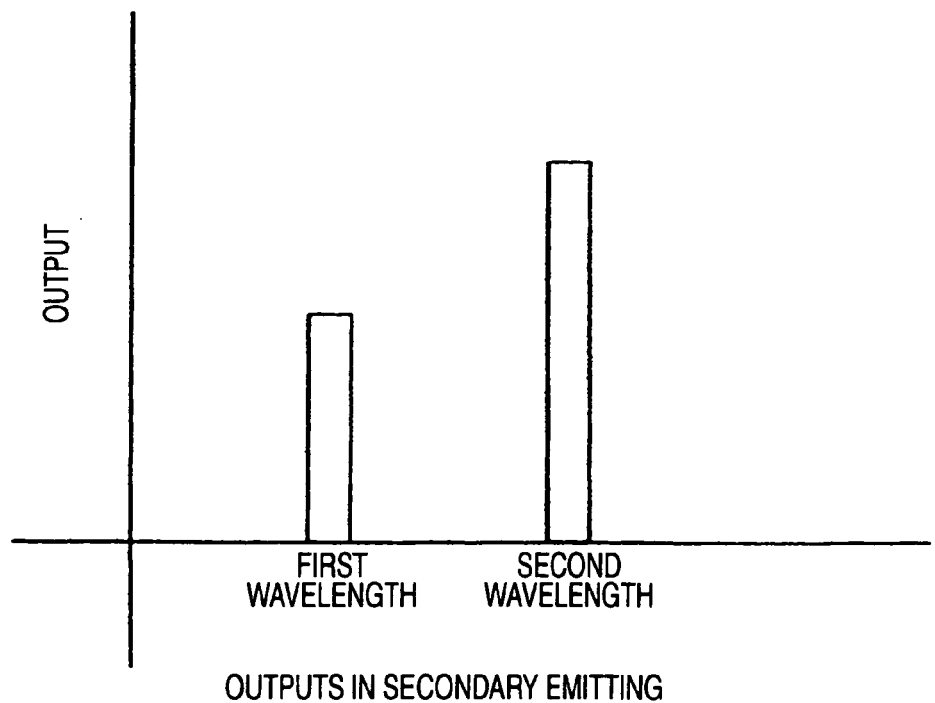
FIG. 18 is a diagram for explaining prevention of the influence (false alarm) caused by the secondary radiation in the flame detector according to the invention.

In a case where a base material of the first band pass filter 3a and the second band pass filter 4a, a deposition film, and the like are formed of a substantially same material (in a case where a transmissive band is close), as shown in FIG. 17, secondary radiation of the almost same optical energy is emitted from the first band pass filter 3a and the second band pass filter 4a when light (for example, sunlight) with a wavelength band which is not transmitted through both the first band pass filter 3a and the second band pass filter 4a is incident. Since the secondary radiation emitted from the first band pass filter 3a and the second band pass filter 4a is directly incident on the first infrared-ray receiving element 3b and the second infrared-ray receiving element 4b, the first infrared-ray receiving element 3b and the second infrared-ray receiving element 4b receives the light having the homogeneous energy and outputs the same output value. In this case, since the gain of the amplifier 6 is set larger (higher) than that of the amplifier 5 by the above-described sensitivity adjustment, as shown in FIG. 18, the output from the amplifier 6 becomes larger than that from the amplifier 5. Accordingly, the output of the comparator becomes "0" (low). With such a configuration, it is possible to detect non-flame, thereby preventing an influence (false alarm) caused by the secondary radiation.

According to the invention, like the above-described Patent Document 1, it is possible to prevent the detector from operating erroneously due to the secondary radiation emitted from the band pass filters provided in the front surface of the infrared-ray receiving elements. In the technique disclosed in Patent Document 1, a protective glass has a function for cutting the visible light and the near-infrared rays so that the visible light and the near-infrared rays are not incident on either the first band pass filter or the second band pass filter. Accordingly, there arises a problem in that the light incident on the first band pass filter 3a as well as the second band pass filter 4a becomes attenuated. However, according to the invention, since the light of the predetermined wavelength band first wavelength band) in the first band pass filter 3a is not attenuated but transmitted, it is not necessary to deteriorate the detection sensitivity of the flame like Patent Document 1, thereby detecting the flame with more accuracy.

Figure 19:
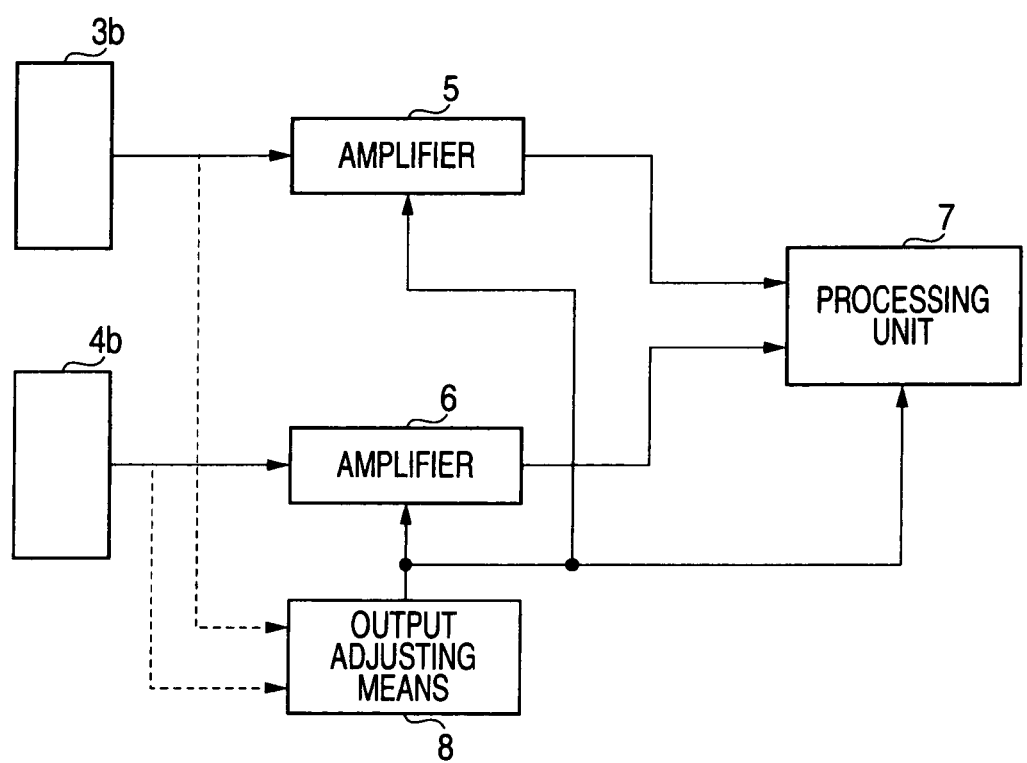
FIG. 19 is a diagram illustrating another example of a configuration of the flame detector according to the invention.

In the above-described embodiment, the output adjusting means 8 adjusts the gains of the amplifiers 5 and 6, as shown in FIGS. 8 and 9. Alternatively, the output adjusting means 8 adjusts the compensation value of the processing unit 7, as shown in FIG. 10. However, the output adjusting means 8 may adjust the gains of the amplifiers 5 and 6 and also adjust the compensation value of the processing unit 7, as shown in FIG. 19. In the examples shown in FIGS. 4, 8, 9, 10, and 19, the amplifiers 5 and 6 are individually provided, but the processing unit 7 may have the function of the amplifiers 5 and 6, for example. In addition, the invention may be modified in different forms.

In other words, as for the output adjusting means 8, the invention is not limited to the above-described examples, but any unit may be used as long as the unit adjusts the outputs of the first infrared-ray receiving element 3b and the second infrared-ray receiving element 4b so that a level of the output of the first infrared-ray receiving element 3b is the same as that of the output of the second infrared-ray receiving element 4b, when the light (specifically, the light having the homogeneous energy without wavelength dependency in a wavelength band from 4.0 to 5.0 μm, for example) having the homogeneous energy in the transmissive wavelength band (first wavelength band) of the first band pass filter 3a and the transmissive wavelength band (second wavelength band) of the second band pass filter 4a is incident on the first band pass filter 3a and the second band pass filter 4a, respectively.

In the above-described embodiment, the transmissive amount adjusting means has been exemplified in FIGS. 5, 6, 7(a) to 7(d). However, the invention is not limited to the above-described examples. Any unit may be used as the transmissive amount adjusting means as long as the unit is configured so that the half bandwidth of the second band pass filter 4a is narrower than that of the first band pass filter 3a and the attenuation rate of the light transmitted through the second band pass filter 4a is larger (higher) than that of the light transmitted through the first band pass filter 3a.

The invention can be used in a fire alarming system and the like.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A flame detector comprising:
   a first band pass filter, having a pass band containing an infrared wavelength specific to flame, that receives first light and passes second light from within the first light;
   a second band pass filter, having a pass band that does not contain an infrared wavelength specific to flame, that receives the first light and passes third light from within the first light;
   a first infrared-ray receiving element that receives the second light passed by the first band pass filter and outputs a first signal that is indicative of the amount of received second light;

a second infrared-ray receiving element that receives the third light passed by the second band pass filter and outputs a second signal that is indicative of the amount of received third light;

an adjusting unit that adjusts the level of one or both of the first and second signals; and a comparator that receives the first and second signals after their respective adjustments, if any, and compares the received levels to detect flame, wherein:

the second band pass filter passes less incident light having homogeneous energy in a transmissive wavelength band of both the first and second band pass filters than does the first band pass filter, and the adjusting unit adjusts the level of one or both of the first and second signals to an extent that would make the first and second signals equal if light having homogeneous energy in the transmissive wavelength band of both the first and second band pass filters is incident upon the first and second band pass filters.

2. The flame detector of claim 1, wherein a half bandwidth of the second band pass filter is narrower than a half bandwidth of the first band pass filter.

3. The flame detector of claim 1, wherein an attenuation rate of the light transmitted through the second band pass filter is larger than an attenuation rate of the light transmitted through the first band pass filter.

4. The flame detector of claim 1, wherein:

the adjusting unit adjusts the levels of the first and second signals by adjusting a first sensitivity of the first infrared-ray receiving element and a second sensitivity of the second infrared-ray receiving element, and the adjusting unit adjusts the second sensitivity to be higher than the first sensitivity so as to cancel a difference between the amount of light transmitted through the first and second band pass filters when light having homogeneous energy in the transmissive wavelength band of the first and second band pass filters is incident on the first and second band pass filters.

5. The flame detector of claim 1, further comprising:

a first amplifier having a first gain; and a second amplifier having a second gain, wherein:

the adjusting unit adjusts the levels of the first and second signals by adjusting the first gain at which the first amplifier amplifies the first output and the second gain at which the second amplifier amplifies the second output, and the adjusting unit adjusts the second gain to be larger than the first gain so as to cancel a difference between the amount of light transmitted through the first and second band pass filters when light having homogeneous energy in the transmissive wavelength band of the first and second band pass filters is incident on the first and second band pass filters.

6. The flame detector of claim 1, wherein:

the adjusting unit adjusts the levels of the first and second signals by adjusting a correction level, and the level of the second output is set higher than the level of the first output by the correction level so as to cancel a difference between the amount of light transmitted through the first and second band pass filters when light having homogeneous energy in the transmissive wavelength band of the first and second band pass filters is incident on the first and second band pass filters.

7. The flame detector of claim 1, wherein the sensitivity of the second infrared-ray receiving element is higher than the sensitivity of the first infrared-ray receiving element.

8. The flame detector of claim 1, further comprising:

a first amplifier having a first gain; and a second amplifier having a second gain, wherein:

the adjusting unit adjusts the levels of the first and second signals by adjusting the first gain at which the first amplifier amplifies the first output and the second gain at which the second amplifier amplifies the second output, and the second gain is larger than the first gain.

9. The flame detector of claim 1, wherein the adjusting unit adjusts the level of the second output higher than the level of the first output by a predetermined level.

* * * * *